(12) United States Patent
Stone et al.

(10) Patent No.: US 12,721,315 B1
(45) Date of Patent: Sep. 1, 2026

(54) BRAIDED PET TOY WITH INTEGRATED PLAY ELEMENTS

(71) Applicant: Guru Pet Company, Inc., Mount Pleasant, SC (US)

(72) Inventors: John James Stone, Mount Pleasant, SC (US); Amy Stone, Mount Pleasant, SC (US)

(73) Assignee: Guru Pet Company, Inc., Mount Pleasant, SC (US)

( * ) Notice: Subject to any disclaimer, the term of this patent is extended or adjusted under 35 U.S.C. 154(b) by 0 days.

(21) Appl. No.: 19/081,467

(22) Filed: Mar. 17, 2025

Related U.S. Application Data

(60) Provisional application No. 63/567,163, filed on Mar. 19, 2024.

(51) Int. Cl.
*A01K 15/02* (2006.01)

(52) U.S. Cl.
CPC .................................. *A01K 15/025* (2013.01)

(58) Field of Classification Search
CPC ............................ A01K 15/025; A01K 15/026
See application file for complete search history.

(56) References Cited

U.S. PATENT DOCUMENTS

| | | | | |
|---|---|---|---|---|
| 7,219,626 | B2 * | 5/2007 | Hurwitz | A01K 15/025 119/707 |
| 7,823,542 | B2 * | 11/2010 | Freeman | D04C 1/12 119/709 |
| 8,215,267 | B2 * | 7/2012 | Axelrod | A23K 10/26 119/710 |
| 2008/0146116 | A1 * | 6/2008 | Di Lullo | A01K 15/025 446/376 |
| 2010/0095901 | A1 * | 4/2010 | Cooper | A01K 15/026 119/707 |
| 2020/0296931 | A1 * | 9/2020 | Bentz | A01K 15/025 |
| 2024/0306607 | A1 * | 9/2024 | Salyer | A01K 5/0114 |
| 2025/0107507 | A1 * | 4/2025 | Bekhit | A01K 15/025 |

* cited by examiner

*Primary Examiner* — Christopher D Hutchens
*Assistant Examiner* — Nevena Aleksic
(74) *Attorney, Agent, or Firm* — Standley Law Group LLP; James L. Kwak; Adam J. Smith

(57) ABSTRACT

A pet toy for integrating play elements is disclosed, along with related methods. Elements, such as flattened fabric strips, may be braided at an angle, such as about 45 degrees from each other, into a rope to define pockets for receiving the play elements. Stitching may be provided across adjacent ones of the flattened fabric strips, such as to further define or secure the pockets. The play elements, such as squeakers, pet food, and/or pet treats may be placed into at least some of the pockets.

20 Claims, 3 Drawing Sheets

BRAIDED PET TOY WITH INTEGRATED PLAY ELEMENTS

CROSS-REFERENCE TO RELATED APPLICATIONS

This application claims the benefit of U.S. provisional application Ser. No. 63/567,163 filed Mar. 19, 2024, the disclosures of which are hereby incorporated by reference as if fully restated herein.

TECHNICAL FIELD

Exemplary embodiments relate generally to a braided pet toy with integrated play elements and/or for integrating play elements, as well as systems and methods related to the same.

BACKGROUND AND SUMMARY OF THE INVENTION

Animals, and particularly household pets, need stimulation to remain healthy. Certain pets, such as cats and/or dogs by way of non-limiting example, are known to react to noise and/or food. A variety of pet toys are known which help provide such stimulation. For example, braided pet toys (e.g., ropes) are known which are sometimes used for tug play between pets or pets and humans, for example. Separately, certain pet toys are known which include noise elements and/or facilitate incorporation of food. What is needed is an improved pet toy with integrated play elements which facilitates stimulation and play.

Braided pet toys which facilitate integration of play elements, or include integrated play elements, of interest to pets are provided. The toy may comprise elements which are braided to form a rope, and therefore sometimes referred to herein as "braided elements". The elements may comprise fabric strips, strands of smaller rope, combinations thereof, or the like, for example but without limitation. The elements, when braided, may form pockets for the play elements.

The play elements may include, for example without limitation, noise elements, food (e.g., treats, food pellets, etc.), scented items, combinations thereof, or the like. Examples of such noise elements include reeded devices which emit a squeaking noise when compressed (hereinafter also a "squeaker"). The braided elements may be knotted at one or both ends. Alternatively, or additionally, caps, seals, bands, combinations thereof, or the like may be employed at an end thereof to hold the braid together. The braided elements may be formed into one or more loops and/or knots. Various arrangements of the braided elements may be utilized.

Play elements may be stuffed into some, or all, of the pockets. The elements may be braided at an angle, such as between 15 and 75 degrees, preferably at or about (e.g., +/−10 degrees) 45 degrees, from a longitudinal axis of the toy to define the some or all of the pockets, at least in part. Distinct lines of stitching may be provided across multiple of the braided elements (e.g., adjacent braided elements). Such stitching preferably extends at least primarily cross-wise to, if not substantially (e.g., within at least 90% of) perpendicular to, a longitudinal axis of the toy to further define, at least in part, some or all of the pockets. These so defined pockets may have, and/or may be configured to hold, the play elements. The stitching may help to secure the integrated, or to be integrated, play elements, such as from removal and/or migration. Alternatively, or additionally, the stitching may strengthen the toy, such as from being torn apart by the pet or otherwise disassembled. While the pockets are sometimes described as being defined by the braided elements and the stitching, the pockets may be defined by either element individually.

The toy may particularly, without limitation, encourage a snuffle type of play where the pet is encouraged to forage for the integrated play elements, removing them from their pockets as a reward and thereby stimulating further play. The toy may also allow for toss, tug, or other types of play.

The toy may be formed into a variety of shapes, such as a relatively long, flexible braided rope (e.g., with knots on both ends), a loop shape (e.g., with one or more knots), and may include additional play elements such as tennis balls, chewing elements, combinations thereof, or the like.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
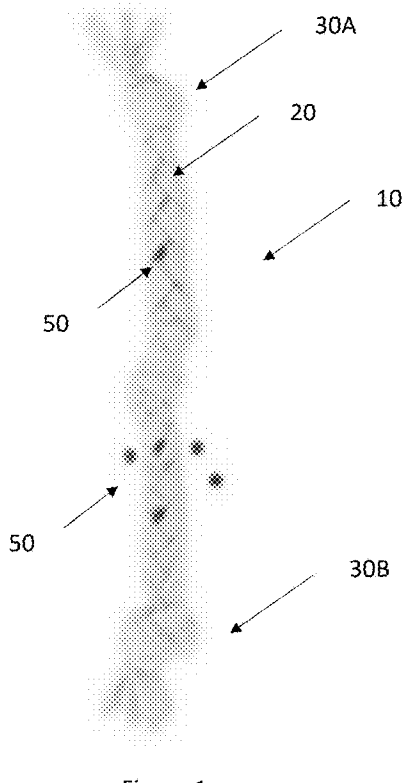
FIG. 1 is a plan view of an exemplary pet toy with integrated play elements.
Figure 2:
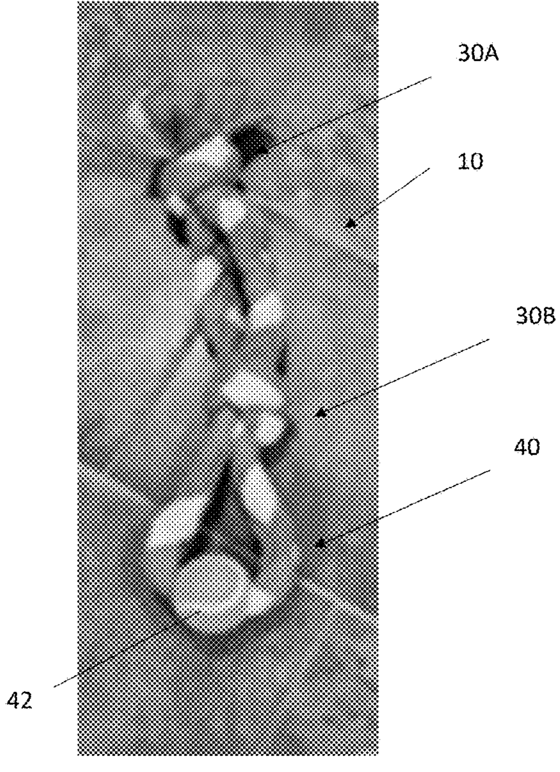
FIG. 2 is a plan view of another exemplary pet toy with integrated play elements.
Figures 3, 4:
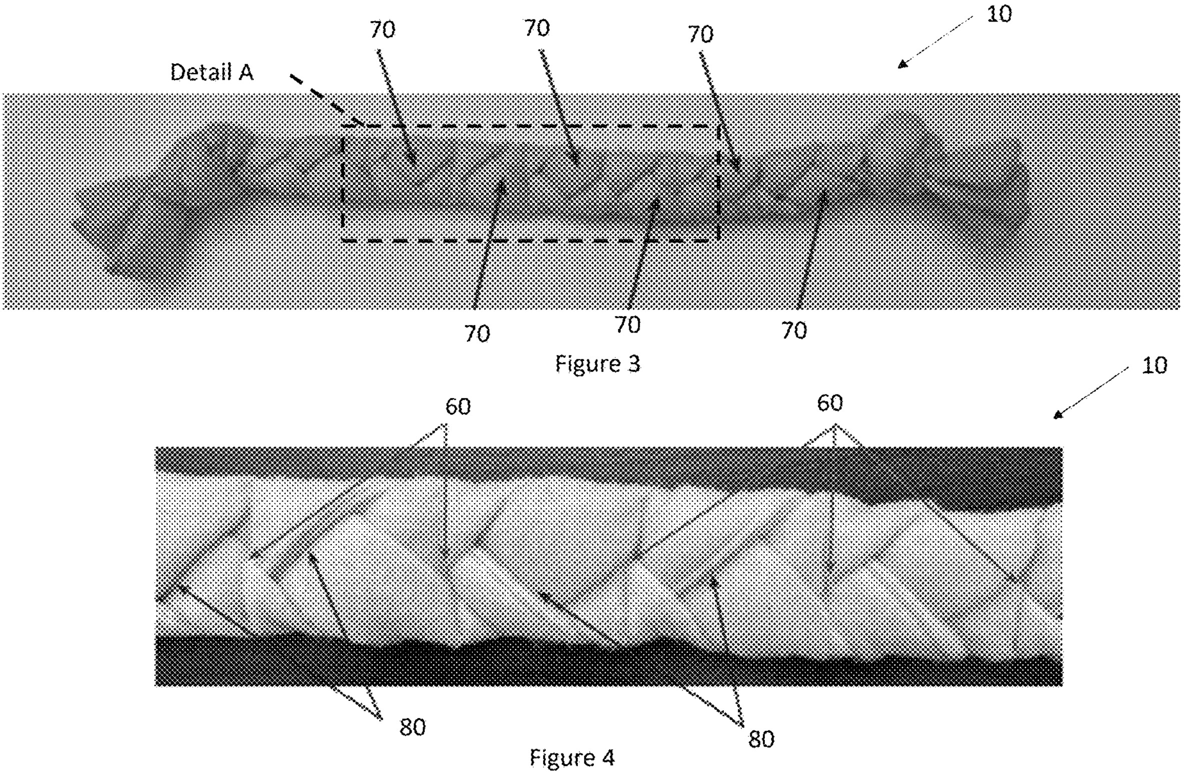
FIG. 3 is a plan view of the pet toy of FIG. 1 with the play elements integrated.
FIG. 4 is a detailed plan view of Detail A of FIG. 3.
Figure 5:
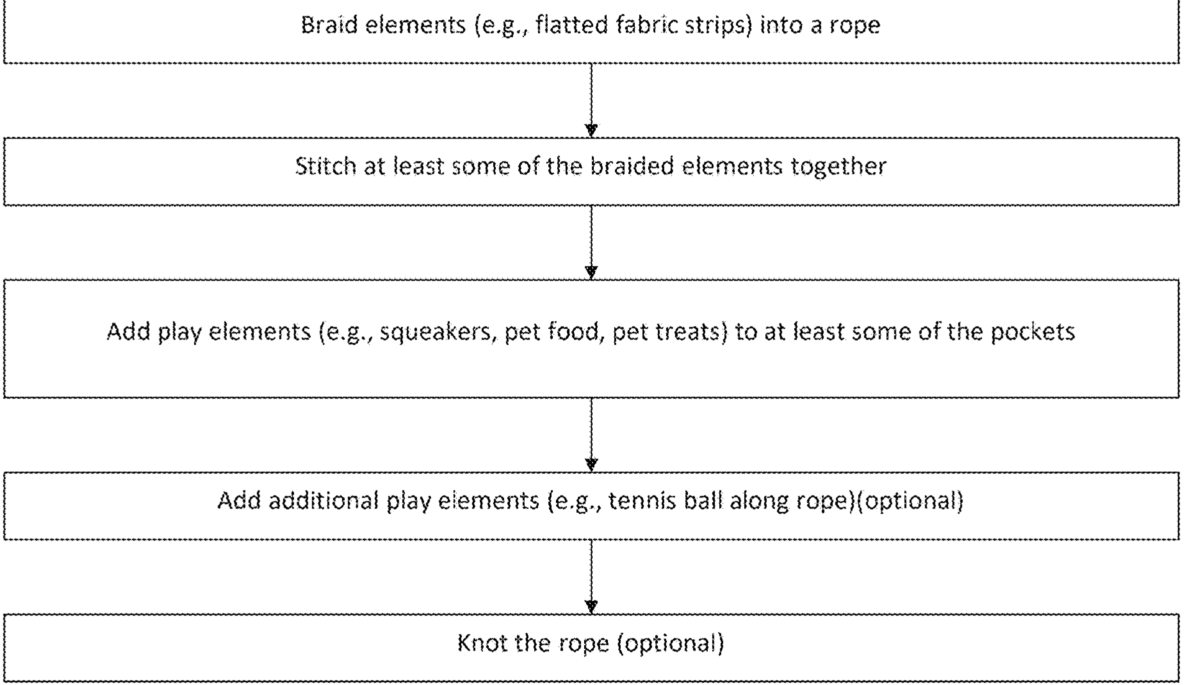
FIG. 5 is a flow chat describing an exemplary method of forming the pet toy of FIGS. 1-4.

FIG. 1 through FIG. 4 illustrate a pet toy 10 which facilitates integration of, or has integrated, play elements 50. FIG. 5 illustrates an exemplary method of generating the pet toy 10. The play elements 50 may be items of interest to a pet, such as but not necessarily limited to a dog and/or cat.

The play elements 50 may include, for example without limitation, noise elements (e.g., squeakers or other noise makers), food (e.g., treats, food pellets, etc.), scented items, combinations thereof, or the like.

The toy 10 may comprise elements 20 which may be braided to form a rope, cord, combinations thereof, or the like. The elements 20 may comprise fabric strips or smaller braided ropes and/or cords, for example, without limitation. The elements 20, when braided, may form pockets 80 for the play elements 50. Preferably, the fabric strips are substantially flattened strips of fabric of sufficient width to facilitate the formation of pockets 80 large enough to accommodate the play elements 50 (e.g., squeakers and/or food pellets). For example, without limitation, the fabric strips may be at least 0.25 inches wide, more preferably at least 0.5 inches wide, at least 0.75 inches wide, at least 1 inch wide, or the like. For example, without limitation, the fabric strips may be at least four times wider than thick, though other multiples, preferably higher, may be utilized. As another example, without limitation, the fabric strips may be less than 0.5 inches thick, more preferably less than 0.25 inches thick, though other thicknesses may be utilized.

The elements 20 may be braided at an angle, such as between 15 and 75 degrees, preferably at or about (e.g., +/−10 degrees) 45 degrees, relative to a longitudinal axis of the toy 10 to define the some or all of the pockets 80, at least in part. The elements 20 may be braided at or about (e.g., +/−10 degrees) the same angle or at different angles.

The braided elements 20 may be formed into knots 30A, 30B at one end, both ends, along the rope, combinations thereof, or the like, such as to hold the braid together, form the rope into shapes, provide grasp points (e.g., for human and/or pet), provide unique shapes and engaging play features, hold other items (e.g., tennis balls) located along the rope in place, combinations thereof, or the like. Alternatively, or additionally, caps, seals, bands, combinations thereof, or the like may be employed at an end thereof to hold the braid together.

The play elements 50 may be stuffed into some or all of the pockets 80. Stitching may be provided to reinforce and/or form some or all of the pockets 80.

The toy 10 may comprise stitching 60 which holds, or assists with holding, at least portions of the braided elements 20 together. In exemplary embodiments, without limitation, a respective, distinct line of stitching 60 extends across multiple of, preferably two adjacent ones of, the fabric strips forming each pocket 80, though the stitching 60 may extend differently. Each line of stitching 60 may extend at least primarily crosswise, if not substantially (e.g., within 80% of) perpendicular, to a longitudinal axis of the toy 10 when the toy 10 is laid flat in maximum extension. The stitches 60 may be provided at some or all of the pockets 80 having, or configured to hold, the stuffed play elements 80. The stitches 60 may define, at least in part, the pockets 80. Each line of stitching 60 may extend across multiple braided elements of the toy 10. The lines of stitching 60 may be provided at a same or different orientation. The stitches 60 may help to secure the integrated, or to be integrated, play elements 80, such as from removal or migration. Alternatively, or additionally, the stitching 60 may strengthen the toy 10, such as from being torn apart by the pet or otherwise disassembled.

The toy 10 may particularly, without limitation, encourage a snuffle type of play where the pet is encouraged to forage for the integrated play elements, removing the play elements 50 from the pockets 80 as a reward, and thereby also stimulating further play to retrieve the remaining play elements 50. The toy 10 may, additionally or alternatively, facilitate play in the form of toss, tug, or the like, by way of example.

The toy 10 may be formed into a variety of shapes, such as a long, flexible braided rope (e.g., with knots 30 on both ends, see FIGS. 1 and 3), a loop shape (e.g., with one or more knots 30, see FIG. 2), combinations thereof, or the like. As those of skill in the art will recognize, the toy 10 may be formed into a wide variety of shapes. A variety of number, location, and/or type of knots 30 may be utilized, such as to form various shapes and/or to play and/or interaction elements for the pet.

The toy 10 may optionally include additional play elements 42, such as along the rope, at the pockets 80, or otherwise, such as tennis balls, chewing elements, knots 30, combinations thereof, or the like. In exemplary embodiments, such additional play elements 42 comprise a hole for the braided elements 30 to pass therethrough. A variety of number, location, and/or type of additional play elements 42 may be provided.

The toy 10 may be used for any type or kind of pet, such as dogs, cats, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A pet toy comprising:

play elements wherein the play elements comprise at least one of squeakers, treats, pet food, or scented toys;

elements braided into a rope and defining pockets accessible from an exterior of the pet toy for receiving the play elements, wherein the elements comprise flattened fabric strips braided at an angle of between 15 and 75 degrees; and stitching, discrete portions of which join adjacent ones of the braided elements, wherein each of the discrete portions of stitching extend linearly across an edge of a respective one of the braided elements forming an edge of a respective one of the pockets.

2. The pet toy of claim 1 wherein:

the flattened fabric strips are braided at about 45 degrees.

3. The pet toy of claim 1 wherein:

the rope is formed into one or more knots along a longitudinal length of the pet toy.

4. The pet toy of claim 3 wherein:

the rope is formed into one or more loops, each joined by a respective one of the one or more knots.

5. The pet toy of claim 4 further comprising:

one or more additional play elements, wherein the braided elements pass through each of the one or more additional play elements along a respective one of the one or more loops.

6. The pet toy of claim 5 wherein:

each of the one or more additional play elements comprise a tennis ball with opposing holes for the braided elements.

7. A pet toy with integrated play elements, said pet toy comprising:

the pet toy of claim 1; and the play elements provided at some or all of the pockets.

8. The pet toy of claim 7 wherein:

the play elements comprise squeakers.

9. The pet toy of claim 7 wherein:

the play elements comprise pet food or treats.

10. A pet toy comprising:

play elements wherein the play elements comprise at least one of squeakers, treats, pet food, or scented toys;

flattened fabric strips braided at about 45 degrees from each other into a rope to define pockets accessible from an exterior of the pet toy for receiving the play elements; and stitching, discrete portions of which join adjacent ones of the flattened fabric strips, wherein each of the discrete portions of stitching extend linearly across an edge of a respective one of the braided elements forming an edge of a respective one of the pockets.

11. The pet toy of claim 10 wherein:

the rope is formed into one or more knots along a longitudinal length of the pet toy.

12. The pet toy of claim 11 wherein:

the rope is formed into one or more loops, each joined by a respective one of the one or more knots.

13. The pet toy of claim 12 further comprising:

one or more tennis balls, each provided along a respective one of the one or more loops with opposing holes where the rope passes through.

14. The pet toy with integrated play elements of claim 10 comprising:

the play elements provided at some or all of the pockets.

15. A method of forming a pet toy comprising:

integrating play elements wherein the play elements comprise at least one of squeakers, treats, pet food, or scented toys;

braiding flattened fabric strips at about 45 degrees from each other into a rope and to define pockets accessible from an exterior of the pet toy for receiving the play elements; and stitching adjacent ones of the flattened fabric strips to further define at least some of the pockets, wherein discrete portions of the stitching join adjacent ones of the braided elements and extend linearly across an edge of a respective one of the braided elements forming an edge of a respective one of the pockets.

16. A method of forming a pet toy having integrated play elements, said method comprising:

performing the method of claim 15; and placing the integrated play elements into at least some of the pockets.

17. A pet toy with integrated play elements formed by the method of claim 16.

18. The pet toy of claim 1 wherein:

each of the discrete portions of stitching extend at least primarily transverse to the edge of the respective one of the braided elements forming the edge of the respective one of the pockets.

19. The pet toy of claim 18 wherein:

each of the discrete portions of stitching extend at least substantially perpendicular to a longitudinal axis of the pet toy when the pet toy is flat in maximum extension.

20. The pet toy of claim 19 wherein:

each of the discrete portions of stitching adjoin only the adjacent ones of the braided elements.

* * * * *